United States Patent [19]

Reinhart

[11] Patent Number: 5,190,714
[45] Date of Patent: Mar. 2, 1993

[54] MOLD CLAMPING SYSTEM
[75] Inventor: William A. Reinhart, Cincinnati, Ohio
[73] Assignee: Cincinnati Milacron Inc., Cincinnati, Ohio
[21] Appl. No.: 791,205
[22] Filed: Nov. 13, 1991

Related U.S. Application Data

[60] Division of Ser. No. 600,850, Oct. 22, 1990, Pat. No. 5,102,327, and a continuation-in-part of Ser. No. 432,462, Nov. 6, 1989, Pat. No. 4,990,084.

[51] Int. Cl.$^5$ ............................................. B29C 45/66
[52] U.S. Cl. .............................. 264/328.1; 264/328.11; 425/590; 425/593; 425/451.2; 425/451.6
[58] Field of Search ................... 264/328.1, 328.11; 425/150, 167, 589, 590, 592, 593, 595, 450.1, 451.2, 451.5, 451.6, 451.7, 451.9

[56] References Cited

U.S. PATENT DOCUMENTS

| | | | |
|---|---|---|---|
| 2,484,712 | 10/1949 | Jobat | 425/136 |
| 3,104,433 | 9/1963 | Hoern | 425/590 |
| 3,191,235 | 6/1965 | Rougemont | 425/451.2 |
| 3,534,442 | 10/1970 | Mahle | 425/593 |
| 3,642,405 | 2/1972 | Eggenberger et al. | 264/40.5 |
| 3,704,973 | 12/1972 | Renfrew et al. | 425/150 |
| 3,738,183 | 6/1973 | Ball, Jr. et al. | 74/89.15 |
| 3,803,928 | 4/1974 | Konkal et al. | 74/89.15 |
| 4,000,661 | 1/1977 | Menzel | 74/89.15 |
| 4,281,977 | 8/1981 | Farrell | 425/593 |
| 4,540,359 | 9/1985 | Yamazaki | 425/135 |
| 4,542,661 | 9/1985 | Teramachi | 74/424.8 NA |
| 4,557,156 | 12/1985 | Teramachi | 74/459 |
| 4,614,128 | 9/1986 | Fickler | 74/424.8 B |
| 4,615,669 | 10/1986 | Fujita et al. | 425/147 |
| 4,696,632 | 9/1987 | Inaba | 425/150 |
| 4,741,685 | 5/1988 | Inaba et al. | 425/145 |
| 4,773,845 | 9/1988 | Nagura et al. | 425/592 |
| 4,781,568 | 11/1988 | Inaba | 425/451.7 |
| 4,781,872 | 11/1988 | Inaba | 264/40.5 |
| 4,797,086 | 1/1989 | Adachi | 425/589 |
| 4,828,475 | 5/1989 | Kamiguchi | 425/150 |
| 4,828,476 | 5/1989 | Yoshiharu et al. | 425/150 |
| 4,877,388 | 10/1989 | Inaba et al. | 425/451.9 |
| 4,929,165 | 5/1990 | Inaba et al. | 425/150 |
| 4,938,682 | 7/1990 | Kadoriku et al. | 425/451.6 |
| 4,990,084 | 2/1991 | Reinhart | 425/590 |

Primary Examiner—Jill L. Heitbrink
Attorney, Agent, or Firm—Nies, Kurz, Bergert & Tamburro

[57] ABSTRACT

A clamping system for traversing and clamping molds in a molding machine, the clamping system including a toggle-type clamp arrangement defined by a plurality of pivotally connected links. A movable crosshead is connected with one end of the toggle and is carried on a crosshead guide, and a ball screw is rotatably secured to the movable crosshead to extend in the direction opposite from the molds and through a stationary platen. A ball nut rotatably carried by the stationary platen is in engagement with the ball screw and is drivingly connected with a first motor to axially move the ball screw to provide between the molds a clamping force sufficient to resist separation of the molds during high pressure injection of molding material. A second motor is drivingly coupled with the ball screw and is movable therewith in an axial direction. The second motor is adapted to rotate the ball screw for rapid traverse movement of the movable crosshead to rapidly bring the molds into and out of contact.

5 Claims, 5 Drawing Sheets

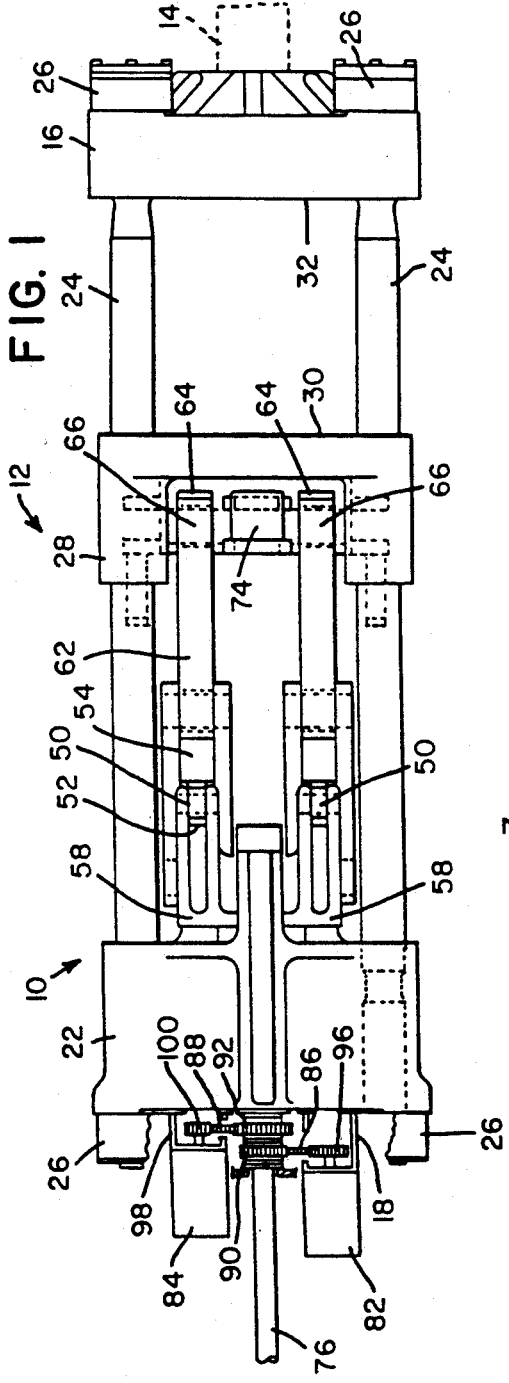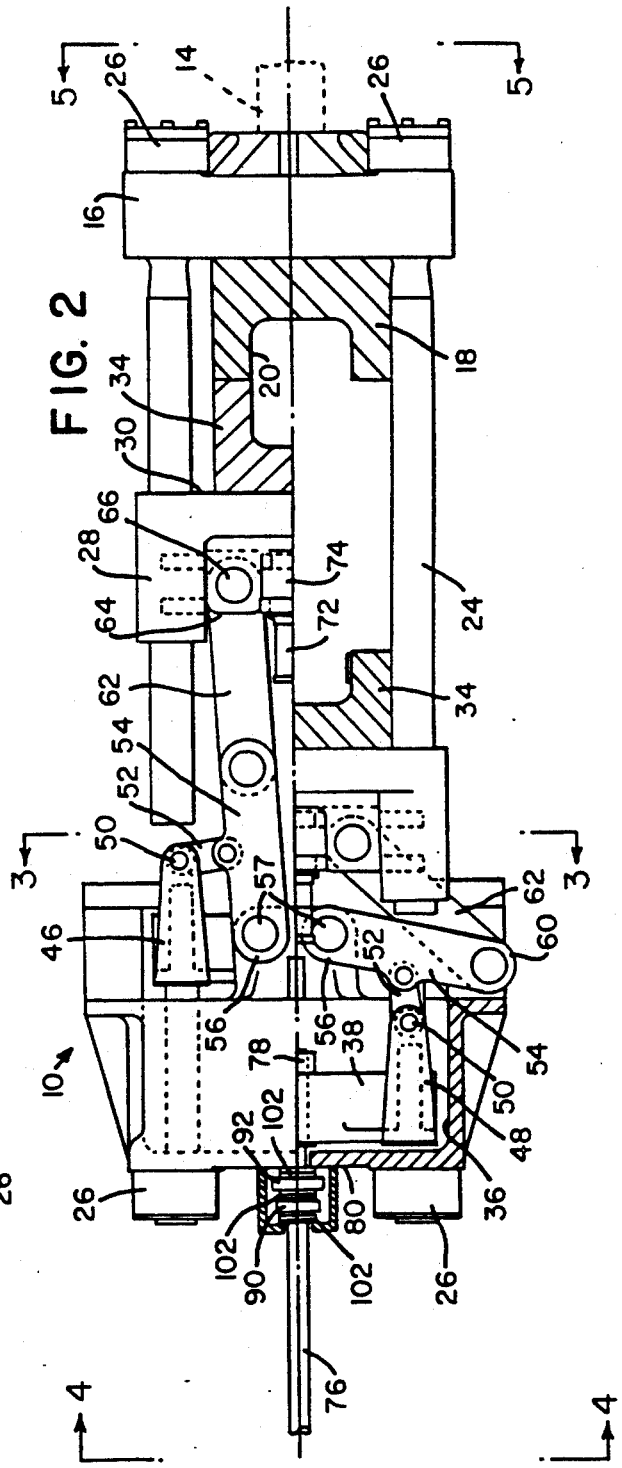

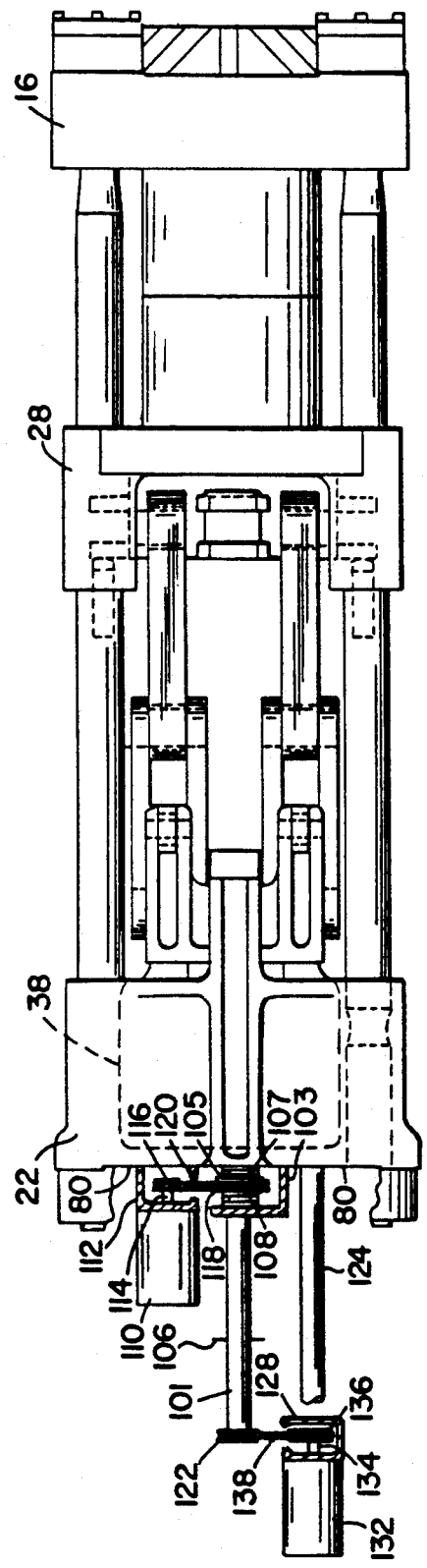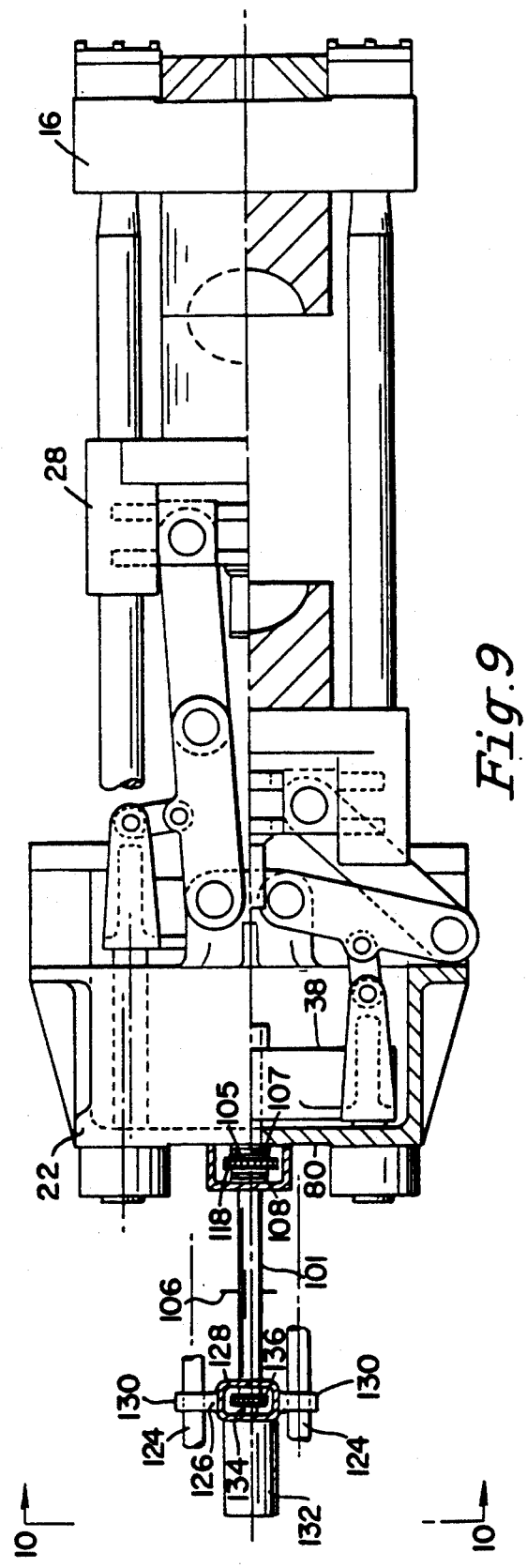

MOLD CLAMPING SYSTEM

CROSS REFERENCE TO RELATED APPLICATION

This application is a division of copending application Ser. No. 07/600,850, filed Oct. 22, 1990, now U.S. Pat. No. 5,102,327, which is a continuation-in-part of copending application Ser. No. 07/432,462, filed Nov. 6, 1989, now U.S. Pat. No. 4,990,084.

BACKGROUND OF THE INVENTION

1. Field of the Invention

The present invention relates to a mold clamping system, for example for a plastics injection molding machine, in which the clamping system operates to move a movable mold section toward and away from a stationary mold section to define a closed mold cavity to permit high pressure injection molding of a part made from plastics material. More particularly, the present invention relates to a mold clamping system in which the relative movement between the mold sections is performed by a pair of electric motors, each of which drives a respective ball nut to advance a single, non-rotatable screw that is attached to a movable platen that, in turn, carries a movable mold section. The motors selectively move the movable mold section into and out of contact with a stationary mold section mounted on a fixed platen.

Description of the Related Art

Until relatively recently, in commercial practice the mold closing and clamping systems in machines such as die casting or injection molding machines were traditionally hydraulically driven, the hydraulic devices including one or more actuators of the piston-cylinder type for rapid traverse of the movable mold section as well as for applying clamping forces to maintain the mold sections in contact during injection of the material into the mold cavity under high pressure. Further, the use of hydraulic drives extended both to hydraulic-cylinder-operated machines, in which a large diameter movable ram is carried within a large diameter hydraulic cylinder to provide the required high clamping forces to maintain mold sections in closed condition during an injection operation, as well as to toggle-type machines utilizing a series of interconnected links or levers to actuate and control the movement of the movable mold section.

However, with the advent of more sophisticated electrical control systems for monitoring and controlling the various structural elements of molding machines during the various steps involved in a molding cycle, it was found that the use of hydraulic motors and hydraulic actuators resulted in a limitation on the degree of control that could be obtained by such sophisticated electrical control systems. For example, hydraulic-fluid-operated mold clamping systems are not capable of the precision corresponding with the precision attainable with electrical control systems, principally because of the small, yet meaningful, compressibility effects of the hydraulic fluid, as well as the heating and consequent expansion that the hydraulic fluid undergoes during the course of a number of molding cycles As a result of those factors, an hydraulically-controlled system includes a number of operating factors that each involve a time delay, and consequently the overall cycle time for such systems is greater than that for an electrically-controlled system. In order to reduce cycle time, components capable of greater precision of control and of movement are needed, and an electrical-system provides such components.

Although reasonably good control has been achieved in hydraulically-operated clamp systems, as noted above a different drive arrangement must be used if it is desired to attempt to reduce further the overall molding cycle time, which directly influences the cost of the molded parts. Electric motor drives for mold clamping systems had been suggested some years ago (see, for example, U.S. Pat. No. 2,484,712, which issued Oct. 11, 1949, to Conrad Jobst, and United Kingdom Patent 1,136,573, which was published on Dec. 11, 1968), but there has not been widespread use of electric motor drives. Moreover, each of those patents discloses an electrical drive system in which an electric motor drives a mold closing and clamping system through a gear transmission which, because of the accumulation of mechanical tolerances in the several interconnected parts, is incapable of sufficiently precise control of a movable platen position. Furthermore, the above-identified United Kingdom Patent discloses a system utilizing a mechanical flywheel, which results in a system having a great deal of inertia, thereby further rendering difficult the precise and rapid control of the mold closing and clamping system.

More recent patents that disclose electric-motor-operated mold actuation and clamping systems wherein a pair of electric motors is provided for mold movement include U.S. Pat. No. 4,615,669, which issued on Oct. 7, 1986, to Fujita et al.; U.S Pat. No. 4,828,475, which issued on May 9, 1989, to Kamaguchi; U.S. Pat. No. 4,828,476, which issued on May 9, 1989, to Yoshiharu et al.; U.S. Pat. No. 4,877,388, which issued on Oct. 31, 1989, to Inaba et al.; and U.S. Pat. No. 4,929,165, which issued on May 29, 1990, to Inaba et al.

Accordingly, it is an object of the present invention to provide an electric-motor-type drive arrangement for the clamping system of a molding machine.

It is another object of the present invention to provide an electrically-driven mold clamping system in which a pair of motors are provided, one of the motors being operable to effect rapid traverse of a screw connected with a movable platen, while the other motor is operable when the movable platen has reached the limit of its path of travel, in order to provide a high clamping force in order to tightly clamp the movable mold portion against the stationary mold portion.

It is a further object of the present invention to provide an electrically-operated mold clamping system that is capable of precise control to minimize dead time during a molding cycle, and to thereby reduce the overall time for a single operating cycle.

SUMMARY OF THE INVENTION

Briefly stated, in accordance with one aspect of the present invention, a method of operating a molding machine is provided for molding materials that are injected into a mold cavity defined by a pair of cooperating mold portions. The machine includes a mold clamping system for opening and closing a pair of cooperating mold portions, the clamping system including at least one movable platen that carries a mold portion toward and away from an opposed mold portion. A platen drive arrangement is connected with the movable platen for moving the movable platen toward and away from a second, stationary platen. The platen moving arrangement includes a screw that is rotatably carried by a movable crosshead, and a first motor drive operatively connected with the screw for rotational engagement therewith for axially moving the screw at a first linear speed. A second motor drive arrangement operatively connected with the screw is provided for rotational engagement therewith for axially moving the screw at a second linear speed, wherein the second drive arrangement is adapted to provide a larger output torque than is the first drive arrangement. The first motor is energized to rotate the screw at a first rotation al speed to cause rapid traverse of the movable platen toward and away from the stationary platen. The second motor is energized to cause slow traverse of the movable platen toward the stationary platen to bring the platens into contacting relationship and to hold the platens together tightly with a contact force that is sufficient to offset an oppositely directed force resulting from the injection into the mold cavity of pressurized plastic material.

BRIEF DESCRIPTION OF THE DRAWINGS

FIG. 1 is a top view of an injection molding machine having a mold traversing and clamping arrangement in accordance with the present invention.

FIG. 2 is a side elevational view, partially in section, of the injection molding machine shown in FIG. 1, in which the upper half of the figure shows the parts of the mold clamping system in their relative positions when the movable platen is in its right-most position with the mold sections engaged, and in which the lower half of the figure shows the respective parts in their relative positions when the movable platen has been withdrawn from and is fully retracted away from the stationary platen.

FIG. 8 is a top view of another embodiment of an injection molding machine having a pair of motors for operating a mold clamping system.

FIG. 9 is a side elevational view, partially in section, of the injection molding machine of FIG. 8, and showing the parts thereof in two different operating positions, as in the first embodiment shown in FIG. 2.

DESCRIPTION OF THE PREFERRED EMBODIMENTS

Figure 3:
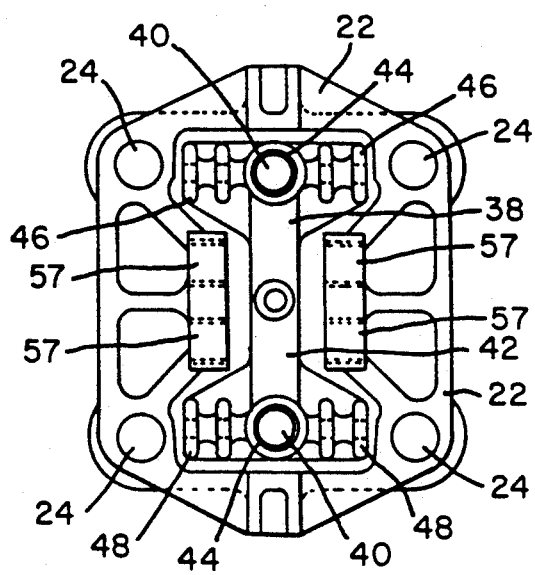
FIG. 3 is an elevational view taken along the line 3—3 of FIG. 2.

Referring now to the drawings, and particularly to FIGS. 1 and 2 thereof, there is shown a mold clamping system 10 of an injection molding machine 12. Although an injection molding machine includes a mold clamping system 10 as well as a plastication and injection system 14, only the mold clamping system has been shown in detail because those skilled the art are familiar with the possible forms of plastication and injection systems that can be employed. Each of the mold clamping system 10 and plastication and injection system 14 is mounted on a base (not shown). For illustrative purposes, plastication and injection system 14 can be a typical reciprocating screw injection unit of a type that is well known to those skilled in the art.

It should be noted at the outset that although described herein in the context of a plastics injection molding machine, the present invention is also applicable to metal die casting machines, rubber molding machines, as well as to other machines wherein rapid movement of one part relative to another part is desired, along with a high force to hold the two parts in predetermined positions.

Clamping system 10 includes a stationary platen 16 to which is secured one mold section 18 that includes a portion of a mold cavity 20 that defines the outer surface of a desired part to be molded. Spaced from stationary platen 16 along a longitudinal axis is a die height platen 22 which, like stationary platen 16, is secured to the machine base (not shown). Extending between stationary platen 16 and die height platen 22 are four cylindrical tie rods 24, which are preferably disposed in a square or a rectangular array with their axes parallel with each other. Stationary platen 16 and die height platen 22 are secured to the tie rods by means of respective nuts 26 that are threadedly engaged with an external thread (not shown) that is formed at the respective longitudinal ends of each of tie rods 24.

Slidably carried on tie rods 24 is a movable platen 28, which is of generally rectangular configuration and which includes a face 30 that is opposite to and in facing relationship with a corresponding fixed face 32 on stationary platen 16. Face 30 of movable platen 28 carries mold section 34 that includes another portion of mold cavity 20. Mold section 34 is adapted to be cooperatively engaged with mold section 18 to define therebetween a closed mold cavity 20 of a particular shape to provide molded parts having the desired outer configuration.

As best seen in FIG. 2, die height platen 22 includes a recess 36 that faces movable platen 28 and is adapted to receive a movable crosshead 38 that is slidably carried on a pair of vertically spaced, parallel crosshead guide rods 40 (see FIG. 3), each of which has its respective longitudinal axis positioned within the rectangular cross section defined by tie rods 24, and disposed in parallel with the longitudinal axes of tie rods 24.

Movable crosshead 38 includes a vertically-extending center member 42 that carries a pair of spaced, parallel sleeves 44 through which respective crosshead guide rods 40 pass. Movable crosshead 38 also includes two pairs of laterally spaced upper link supports 46 and two correspondingly arranged pairs of lower link supports 48 that extend from movable crosshead 38 in a direction toward movable platen 28. Each of upper and lower link supports 46, 48 includes a respective pivot 50, to which one end of a respective idler link 52 is pivotally connected. Thus, movable crosshead 38 carries four such idler links 52. The opposite ends of each of idler links 52 are connected with respective first links 54 at an intermediate position between the spaced ends of each of first links 54. One end 56 of each of first links 54 is pivotally carried in a yoke 58 that extends outwardly from die height platen 22 toward movable platen 28. The other, opposite ends 60 of each of first links 54 are pivotally connected with one end of respective second links 62, the opposite ends 64 of which second links 62 are each pivotally connected with movable platen 28 through respective pivots 66.

As best seen in FIG. 2, the initial positions of the respective movable parts of clamp system 10 are shown in the lower portion of the figure, wherein movable crosshead 38 is received within recess 36 of die height platen 22, with respective first and second links 54 and 62 defining a V. As movable crosshead 38 is shifted toward the right, as viewed in FIG. 2, upper and lower link supports 46, 48 carry idler links 52 to the right, thereby pivoting the lowermost first links 54 in a counterclockwise direction about respective pivots 57, and the uppermost first links 54 in a clockwise direction about their respective pivots 57. The pivotal movements of first links 54 move second links 62 in a direction toward stationary platen 16, as a result of which movable platen 28 is shifted along tie rods 24 from left to right, as viewed in FIG. 2.

Figure 5:
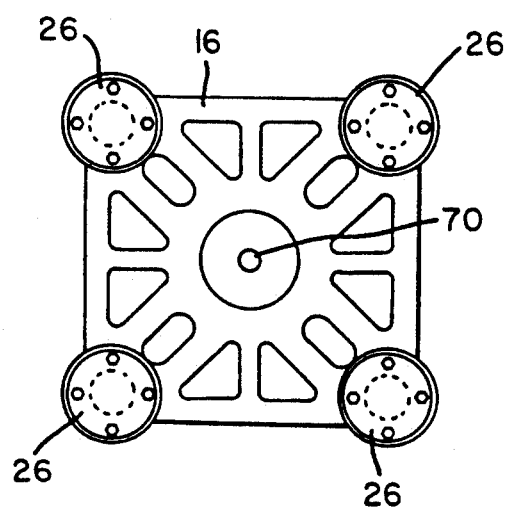
FIG. 5 is an elevational view taken along the line 5—5 of FIG. 2.

When movable crosshead 38 has moved from left to right the maximum distance, the positions of the respective parts are as shown in the upper half of FIG. 2, in which the respective longitudinal axes of connected ones of first and second links 54, 62 are aligned, with the result that movable platen 28 is moved to its right-most position relative to die height platen 22. As a consequence, mold sections 18 and 34 are brought into cooperative relationship and define therebetween closed mold cavity 20 that is adapted to receive molten plastic material from injection unit 14, which injects softened and flowable plastic material through a sprue (not shown) that extends from mold cavity 20 through the rightmost wall of stationary mold section 18, and communicates with passageway 70 (see FIG. 5) in stationary platen 16, with which passageway injection unit 14 communicates.

After the necessary quantity of molten plastic material is injected into closed mold cavity 20, and after a sufficient cooling period has elapsed, movable crosshead 38 is retracted by moving it from right to left, as viewed in FIG. 2, to separate mold sections 18 and 34 a sufficient distance to permit removal of the resulting molded part. In that connection, an ejector cylinder 72 can be provided on movable platen 28 to shift an ejector plate 74 that carries one or more ejector rods (not shown) to eject the molded part from movable mold section 34, whereupon movable crosshead 38 can again be moved toward the right, as viewed in FIG. 2, to position the mold sections for receiving a second shot of molten plastic material to form a second part.

Referring once again to FIG. 2, and particularly to the lower half thereof, movable crosshead 38 includes a ball screw 76, that is non-rotatably secured thereto by means of a nut 78. Ball screw 76 is positioned to extend from movable crosshead 38 in an opposite direction from movable platen 28 and through the transversely extending end wall 80 of die height platen 22.

As best seen in FIG. 1, ball screw 76 is driven by a pair of electric motors 82, 84 through respective toothed belts 86, 88 that are adapted to drive respective ball nuts 90, 92, each of which is rotatably carried on ball screw 76 and is adapted to be rotatably engaged therewith. Among the types of motors that can be used are servomotors, induction motors, DC brushless motors, and the like.

As best seen in FIG. 1, motor 82 is supported from a housing 94 that houses drive sprocket 96, and is secured to rear wall 80 of die height platen 22. Similarly, motor 84 is supported from a housing 98 that houses drive sprocket 100 and is also secured to rear wall 80 of die height platen 22, on the laterally opposite side of a vertical centerline passing through ball screw 76. As is apparent from FIG. 1, drive sprocket 96 has a larger diameter than drive sprocket 100 and, consequently, the former causes more rapid rotation of its associated ball nut 90 than does drive sprocket 100 to, in turn, cause more rapid linear movement of ball screw 76 in a direction based upon the direction of rotation of the ball nut. Thus associated motor 82 is adapted to provide rapid traverse of movable crosshead 38.

On the other hand, motor 84, which carries smaller diameter drive sprocket 100, is adapted to rotate its corresponding ball nut 92 at a slower rotational speed, to thereby impart greater torque to ball screw 76.

Figure 4:
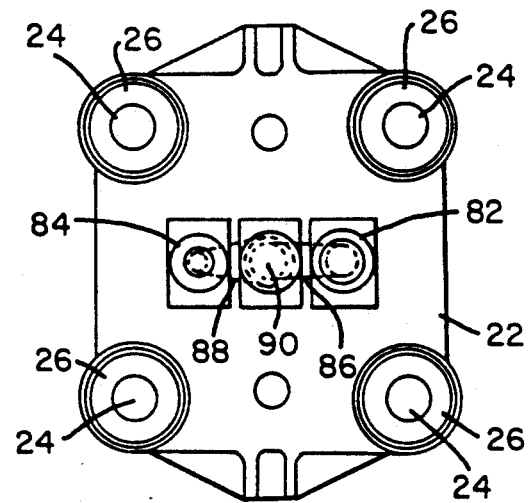
FIG. 4 is an elevational view taken along the line 4—4 of FIG. 2.

The respective ball nuts 90, 92 are spaced from each other along the axis of ball screw 76 and are also spaced from rear wall 80 of die height platen 22 and the inner wall of the housing by means of thrust bearings 102, which can be of any convenient type, as will be appreciated by those skilled in the art. The positions of the respective motors 82, 84 and the differences in sizes of the respective drive sprockets 96, 100 are also apparent in FIG. 4 of the drawings.

Figure 6:
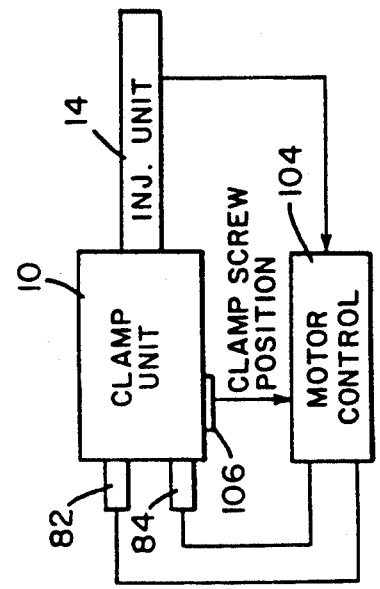
FIG. 6 is a block diagram showing a control arrangement for the injection molding machine shown in FIGS. 1 and 2.

The operation of the respective motors 82, 84 is controlled by a control system that is schematically illustrated in FIG. 6. As there shown, each of motors 82, 84 is connected to a motor control unit 104 that is adapted to operate the respective motors during predetermined portions of a molding machine operating cycle.

Because the present invention contemplates very accurate control of the longitudinal position of the ball screw, an external, linear position transducer, such as a shaft angle encoder 106 carried by ball screw 76, can be provided for determining the axial and rotational position of ball screw 76 relative to die height platen 22. Another possible form of ball screw position sensor can be, for example, an internal angular position encoder (not shown) provided within either motor because each of motors 82, 84 is normally continuously connected with ball screw 76, and therefore either motor can provide the sensing point for a suitable output signal representative of the longitudinal position of the ball screw.

Figure 7:
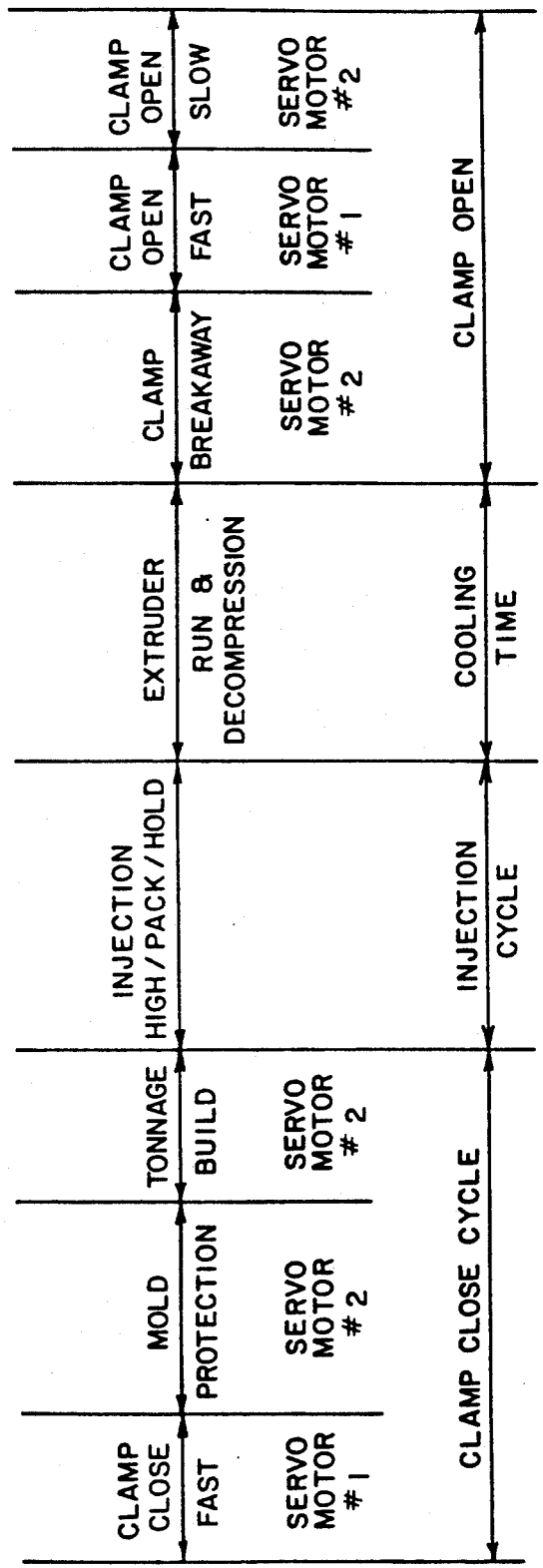
FIG. 7 is a sequence diagram for the injection molding machine shown in FIGS. 1 and 2, identifying the several portions of a single operating cycle of the machine.

An operating cycle for an injection molding machine incorporating the mold clamping system in accordance with the present invention is shown in FIG. 7, which shows an operating cycle that begins when the mold halves are separated from each other by a predetermined distance that is sufficient to permit a molded part to fall from the mold cavity to a suitable part collector positioned below the mold portions. Initial movement of movable platen 28 and movable mold section 34 toward stationary platen 16 and stationary mold portion 18 is accomplished through the operation of rapid traverse motor 82, referred to in FIG. 7 as "motor #1," until a position has been reached at which first and second links 54 and 62 are each in their extended position, as illustrated in the upper half of FIG. 2, and movable platen 28 is so positioned that movable mold section 34 is either very close to or in very light initial contact with stationary mold section 18. At that point motor 84, the high torque clamping motor, referred to in FIG. 7 as "motor #2," is started to provide a high torque input to the ball screw. Simultaneously with the startup of high torque clamping motor 84 rapid traverse motor 82 is dropped off line and remains connected with ball screw 76 to free-wheel during the time high torque motor 84 is in operation. The latter then supplies the required torque to ball screw 76 to move movable mold section 34 any remaining distance toward fixed mold section 18 to cause the two mold sections 18, 34 to tightly engage and define closed mold cavity 20. When molten plastic material is injected from injection unit 14 into mold cavity 20 at high pressure, the force of the high pressure material acts on the projected area of mold cavity 20 of movable mold section 34. The force acts in the direction of die height platen 22 and tends to separate the molds by acting to move mold section 34 in a direction away from stationary mold section 18. However, the mold separating force is counterbalanced by the opposite force provided by the extended toggle links and the die height platen.

After mold cavity 20 has been filled with the molten plastic material, the material is permitted to cool to an extent that the resulting molded part will maintain its shape. Clamping 10 unit is then opened by initially operating high torque motor 84 in a reverse direction, as compared with the direction of rotation to move the mold sections together, and upon initial separation of the mold sections high torque motor 84 is dropped off-line, but remains connected to ball screw 76. Rapid traverse motor 82 is then brought on line to rapidly retract movable platen 28 and movable mold section 34 away from stationary mold section 18 until a predetermined distance has been reached, at which point ejector plate 74 is actuated by ejector cylinder 72 to eject the molded part from the mold, and thereby permit the mold sections to be brought together once again for molding another part during the next molding cycle.

Figure 10:
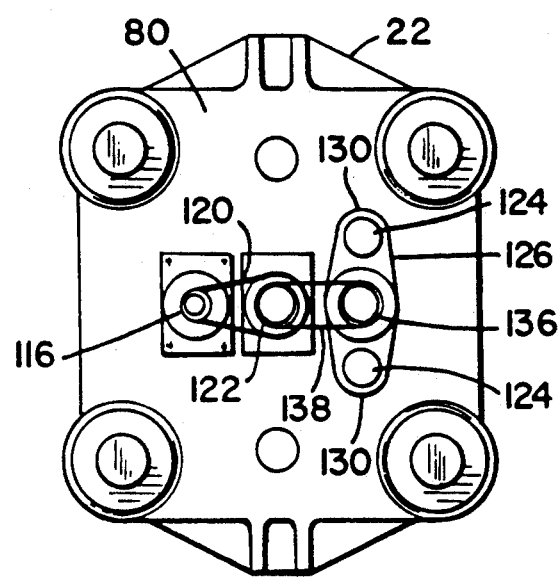
FIG. 10 is an elevational view taken along the line 10—10 of FIG. 9.

Another embodiment of the present invention utilizing a pair of motors to drive a ball screw for rapid traverse and for lockup in an injection molding machine is illustrated in FIGS. 8 through 10. In that embodiment the basic structure and function of the mold clamping system 10, involving plural toggle links connected with a movable crosshead 38, is the same as for the embodiment illustrated in FIGS. 1 through 6. However, the actuating structure and the method of actuation of movable crosshead 38 by the two motors is different in this embodiment, as will now be explained.

Referring now to FIGS. 8 through 10, there is shown a die height platen 22, as in the previously-described embodiment, through which a rotatable ball screw 101 is adapted to be axially movable. The right end of ball screw 101, as viewed in FIGS. 8 and 9, is rotatably carried by movable crosshead 38 in a manner that will be readily apparent to those having skill in the art, and it is therefore not further described. Suffice it to say that the connection between ball screw 101 and movable crosshead 38 is such as to permit free and unimpeded rotation of ball screw 1? 1 relative to crosshead 38, and it is also such as to permit axial loads to be imposed upon crosshead 38, in either longitudinal direction of the machine by ball screw 101, to move crosshead 38 toward the right or toward the left, as viewed in FIGS. 8 and 9.

Attached to end wall 80 of die height platen 22 is a housing 1? 3 that carries and supports a ball nut 105 for rotation on the outer surface of ball screw 101. A pair of thrust bearings 107, 108 are provided, one adjacent each lateral face of ball nut 105, so that the ball nut is free to rotate, but it remains in a fixed vertical plane spaced a predetermined distance from end wall 80. Thrust bearings 106, 108 can be of any Convenient type and serve to transmit axial loads from ball nut 105 to one of end wall 80 of die height platen 22 and the inner surface of housing 103.

Offset laterally from the longitudinal axis of the machine is a clamping force drive motor 110 that is carried on a housing 112 secured to end wall 80. Clamping force drive motor 110 is preferably an electric motor similar to motor 82 as used in connection with the first embodiment of the invention described herein, but other types of motors, such as induction motors, DC brushless motors, and the like can also be employed. Clamping force drive motor 110 includes a drive shaft 114 having its axis parallel with the longitudinal axis of the machine, and carrying at its outer end a drive sprocket 116. Similarly, ball nut 105 carries on its outer periphery a driven sprocket 118, which preferably has a larger diameter than that of drive sprocket 116, so that clamping force drive motor 110 drives ball nut 105 at a slower rotational speed than that of motor 110, but with high torque. Extending over and between each of drive sprocket 116 and driven sprocket 118 is a drive chain 120. Although described herein in terms of a chain and sprocket arrangement, it will be apparent to those skilled in the art that the drive arrangement can also be a belt drive, a gear drive, or the like.

The end of ball screw 101 that extends outwardly beyond end wall 80 of die height platen 22 includes a driven sprocket 122 that is fixedly secured to the ball screw to rotate therewith. A pair of motor guide rods 124 extend outwardly from end wall 80 in the same direction as ball screw 101 and have their axes disposed in parallel relationship with the axis of the ball screw. Slidably carried on motor guide rods 124 is a rapid traverse drive motor crosshead 126 that includes a substantially rectangular central housing 128, and a pair of opposed, outwardly extending arms 130 that carry respective journal bearings for slidably supporting housing 128 for movement along guide rods 124.

Attached to the outermost lateral side of housing 128 is a second, rapid traverse an electric motor 132, preferably motor, having a drive shaft 134 that carries a drive sprocket 136 that is positioned in laterally offset relationship with driven sprocket 122 on ball screw 101. A drive chain 138 extends between drive sprocket 136 and driven sprocket 122 so that output torque from rapid traverse motor 132 is transmitted to ball screw 101. Preferably, the diameter of driving sprocket 136 is greater than that of driven sprocket 122 in order to impart high rotational speed to ball screw 101 to rapidly move movable crosshead 38 and movable platen 28 toward and away from stationary platen 16. In addition to the motor guide rod structure herein described, it will be apparent to those skilled in the art that other rapid traverse motor support and sprocket drive arrangements can be employed, such as, for example, a splined shaft extending from motor 132 to drive and to slidably support drive sprocket 136 for movement with driven sprocket 122, to permit rapid traverse drive motor 132 to remain stationary relative to stationary platen 22 as the motor drives ball screw 101.

In operation, rapid traverse of movable platen 28 is effected by energizing rapid traverse motor 132 to impart high rotational speed to ball screw 101 through drive sprocket 136, drive chain 138, and driven sprocket 122, to thereby rotate the ball screw in the proper direction. When the two platens 28, 16 are close to each other, and immediately before contact therebetween is effected, rapid traverse motor 132 is deenergized and rotation of ball screw 101 is stopped substantially, simultaneously clamping force drive motor 110 is energized in order to drive ball nut 105 at a slower rotational speed than that of the ball screw and to impart higher torque thereto to impart a high clamping force between the two mold halves after contact therebetween has taken place.

Thereafter, molten plastic material can be injected into the mold cavity, the material can be cooled, and the molds can then be opened by reversing the sequence of motor operations. Specifically, clamping force drive motor 110 can be energized in a reverse direction to separate the mold halves, whereupon clamping force drive motor 110 is then deenergized, and rapid traverse motor 132 is energized to continue to turn ball screw 101 in the same direction, but at a rapid rate, to cause movable platen 28 to move toward the left, as viewed in FIGS. 8 and 9, in order to separate the molds a sufficient distance to permit removal of the molded part.

In addition to separately operating rapid traverse drive motor 132 and clamping force drive motor 110, each of the motors can be operated simultaneously to provide additive outputs to further increase the traverse speed of movable platen 28. In that mode of operation, rapid traverse drive motor 132 is stopped when the mold portions have come into contact, or immediately before that has occurred, whereupon clamping force drive motor 110 continues to rotate to drive ball screw 101, which urges movable platen 28 toward stationary platen 16 to tightly engage the mold portions so that the pressure of the injected material as it is introduced into the mold cavity does not separate the mold portions.

As in the case of the first embodiment, accurate control over the position of toggle movable crosshead 38 and ball screw 101 is necessary, and either a linear position transducer (not shown) can be provided for determining the position of ball screw 101 relative to die height platen 22, or, alternatively, an internal angular position encoder (not shown) can be used in conjunction with either or both drive motors for control of the system in the manner illustrated in FIGS. 6 and 7 in connection with the first embodiment.

It will be apparent that the disclosed clamp drive system permits very accurate control over the position and operation of the movable platen, thereby permitting the machine to be operated so that there is a minimum overall cycle time, resulting in rapidly and economically produced parts.

In addition to the applicability of the present invention to a mold clamping system for an injection molding machine, the present invention can also be used in other machines in which molds are used to define molded articles made from other materials, such as die casting machines for forming metallic articles, and rubber molding machines for molding rubber articles. Additionally, the invention can also be used in other applications where a low torque is required for a rapid traverse operation and a high torque is required for a subsequent operation, such as in a machine tool in which rapid traverse is desired for moving a workpiece by means of a screw-operated conveying and feeding system to carry a work holder to which a workpiece is fixed and to move the workpiece from a loading station to a cutting or forming station, and then a high feed force is required to feed the workpiece against a fixed cutting or forming tool while the cutting or forming operation is proceeding.

Although particular embodiments of the present invention have been illustrated and described, it will be apparent to those skilled in the art that various changes and modification can be made with out departing from the spirit of the present invention. Accordingly, it is intended to encompass within the appended claims all such changes and modifications that fall within the scope of the present invention.

What is claimed is:

1. A method for relatively moving a pair of mold members toward and away from each other in a molding machine for molding articles from a flowable material that is injected into a mold cavity defined by the mold members when they are in contact with each other, said method comprising:
   a. providing a first motor for rotating a rotatable ball screw and a second motor for rotation a rotatable ball nut carried by the ball screw to provide a mold drive arrangement for moving one of the pair of mold members toward and away from the other mold member;
   b. energizing the first motor to rotate the ball screw at a first rotational speed to rapidly move the movable mold member at a first linear speed relative to the other mold member; and
   c. when the mold members are in proximity to each other, energizing the second motor to rotate the ball nut at a second rotational speed to drive the ball screw axially at a second linear speed to clamp the mold members tightly together and to permit the injection into the mold cavity of pressurized material without separation of the mold members.

2. A method in accordance with claim 1, wherein the first rotational speed is greater than the second rotational speed so that the first linear speed is greater than the second linear speed.

3. A method in accordance with claim 1, including the step of separating the mold members after the injection of material into the mold cavity by first energizing the second motor to rotate in a reverse direction to move the mold members apart a first distance, and thereafter energizing the first motor to rotate in a reverse direction to rapidly move the mold members apart a second distance to enable the removal of a molded part from the mold cavity.

4. A method for relatively moving a pair of mold members toward and away from each other in a molding machine for molding articles from a flowable material that is injected into a mold cavity defined by the mold members when they are in contact with each other, said method comprising:
   a. providing a first motor for rotating a rotatable ball screw and a second motor for rotating a rotatable ball nut carried by the ball screw to provide a mold drive arrangement for moving one of the pair of mold members toward and away from the other mold member;
   b. simultaneously energizing the first and second motors to rotate the ball screw and the ball nut to rapidly move the movable mold member at a first linear speed relative to the other mold member; and
   c. when the mold members are in proximity to each other, deenergizing the first motor to stop rotation of the screw, and maintaining energization of the second motor to rotate the ball nut to drive the ball screw axially at a second linear speed less than the first linear speed to clamp the mold members tightly together and to permit the injection into the mold cavity of pressurized material without separation of the mold members.

5. A method in accordance with claim 4, including the step of separating the mold members after the injection of material into the mold cavity by first energizing the second motor to rotate in a reverse direction to move the mold members apart a first distance, and thereafter energizing the first motor to rotate in a reverse direction to rapidly move the mold members apart a second distance to enable the removal of a molded part from the mold cavity.

* * * * *